US006298934B1

(12) United States Patent
Shteingold

(10) Patent No.: US 6,298,934 B1
(45) Date of Patent: Oct. 9, 2001

(54) SPHERICAL VEHICLE

(76) Inventor: David Shteingold, 160 Neptune Blvd., #307 W, Lynn, MA (US) 01905

( * ) Notice: Subject to any disclaimer, the term of this patent is extended or adjusted under 35 U.S.C. 154(b) by 0 days.

(21) Appl. No.: 09/660,951

(22) Filed: Sep. 13, 2000

Related U.S. Application Data

(63) Continuation-in-part of application No. 09/534,604, filed on Mar. 27, 2000, now abandoned.

(51) Int. Cl.$^7$ .................................................. B62D 55/04
(52) U.S. Cl. ............................................. 180/10; 280/206
(58) Field of Search .............................. 180/10, 7.1, 326; 280/206, 207, 78

(56) References Cited

U.S. PATENT DOCUMENTS

| | | | |
|---|---|---|---|
| 1,265,496 | * | 5/1918 | Pare . |
| 2,107,766 | * | 2/1938 | Rose . |
| 2,372,043 | * | 3/1945 | Aghnides . |
| 3,876,025 | * | 4/1975 | Green ..................... 180/21 |
| 4,386,787 | | 6/1983 | Maplethorpe ........................ 280/206 |
| 4,401,314 | | 8/1983 | Zimmerman ......................... 280/206 |
| 4,501,569 | | 2/1985 | Clark ................. 446/458 |
| 4,729,446 | | 3/1988 | Sefton ..................... 180/21 |
| 4,861,053 | | 8/1989 | Yeomans ................ 280/205 |
| 4,927,401 | | 5/1990 | Sonesson ................ 446/456 |
| 5,370,410 | | 12/1994 | Heijman ............................. 280/206 |

* cited by examiner

Primary Examiner—Kevin Hurley
(74) Attorney, Agent, or Firm—Boris Leschinsky

(57) ABSTRACT

A spherical vehicle is designed to increase passenger safety by rolling away with the passengers from a collision scene while applying controlled braking force until the speed of the vehicle is reduced to zero. The spherical vehicle has an outer body and a horizontal platform resting on four telescopic columns inside the outer body. Each column is equipped with a set of braking shoes and pads normally engaged with the inside surface of the outer body. The engine and the passenger seats are located on the platform. The driving force from the engine is transmitted to the outer wheel which propels the vehicle forward. A pair of retractable wheels is placed in the lower portion of the vehicle to aid while turning or when the vehicle is stopped. In case of a collision, the braking shoes disengage from the outer body so the spherical vehicle can roll away while the platform with the passengers remain in horizontal orientation. Controlled braking force is applied by a hydraulic emergency system between the braking shoes and the outer body to bring the vehicle to a complete stop. In an alternate embodiment, a smaller spherical or cylindrical wheel is supporting the entire weight of the vehicle and is positioned near the bottom of the outer spherical body of the vehicle. The smaller wheel extends from the vehicle by a minimal distance not to compromise the safety features of the vehicle.

12 Claims, 10 Drawing Sheets

SPHERICAL VEHICLE

CROSS-REFERENCE DATA

This application is a Continuation-in-Part of my previous patent application No. 09/534,604 filed Mar. 27, 2000 now abandoned.

BACKGROUND OF INVENTION

1. Field of the Invention

The present invention relates generally to vehicles, and, more specifically, to generally spherical vehicles incorporating an internal platform with mounted seats and engine, an outside spherical body and an outside wheel for advancing the vehicle forward.

2. Description of the prior art

In the past, various spherical vehicles have been proposed. The earlier versions of such devices can be found in the U.S. Pat. No. 475,130 by Mattison issued in 1892; U.S. Pat. No. 1,625,327 by Moore issued in 1927, and U.S. Pat. No. 2,002,205 by Marten issued in 1935. They generally describe vehicles employing a rotatable outer wheel and a passenger carrying member which is supported in a nonrotating position on roller bearings. These devices are all mechanically complex and do not incorporate all the features of a typical automobile of the present time, most notably those increasing the passenger safety.

U.S. Pat. No. 2,267,254 by Reilley issued in 1942, describes a spherical vehicle provided with an outer shell, an inner platform revolvably mounted to the outer shell, an internal combustion engine driven wheel drivably communicating with the interior of the outer shell, an operator controlled shifting weight for steering the vehicle while in motion, brake shoes controllably coupled to a brake pedal and positioned to decelerate the shell by contacting the inner surface of the shell, and periscopic means to permit the operator the external vision from within the shell, among other features. The apparatus described in this patent is remarkably complex.

Other examples of spherical vehicles in which the outer body is constantly rotating and traversing the terrain while the inside portion is supported with the proper orientation can be found in the following U.S. Pat. No. 3,428,015 by Cloud; U.S. Pat. No. 3,575,443 by Agullar; U.S. Pat. No. 3,746,117 by Alred; U.S. Pat. No. 3,747,956 by Heberlein; U.S. Pat. No. 4,401,314 by Zimmerman; U.S. Pat. No. 4,386,787 by Maplethorpe; U.S. Pat. No. 4,501,569 by Clark; U.S. Pat. No. 4,729,446 by Sefton; U.S. Pat. No. 4,861,053 by Yeomans; 4,927,401 by Sonesson; and U.S. Pat. No. 5,370,410 by Heijman. Complexity and lack of proper safety features is characteristic of these devices.

Modem automobiles in spite of the great variety of safety precautions and devices invented in the recent years are still causing a great deal of injuries and fatalities during acidents and collisions. A significant contributing factor for this phenomenon is the general rectangular shape of the present cars. In case of a collision, the vehicle is forced to stop very rapidly with high levels of braking deceleration. That in turn causes violent shifts inside the vehicle and injuries to its passengers.

Therefore, the need exists for a vehicle with the ability to decrease the braking deceleration in case of an accident thus providing high level of safety and preventing passenger injuries and fatalities.

The general type of a spherical vehicle is capable of providing such an ability with modifications of the present invention.

SUMMARY OF THE INVENTION

Accordingly, it is an object of the present invention to overcome these and other drawbacks of the prior art by providing a novel spherical vehicle capable of gentle deceleration in case of an accident leading to increased safety of operation.

It is another object of the present invention to provide a spherical vehicle capable to withstand the initial shock of a collision and be deflected away from the place of accident while slowly decreasing its speed in a controlled fashion.

It is a further object of the present invention to provide a spherical vehicle equipped with an outer wheel driven by an internal engine or a battery powered electrical motor for advancing the vehicle forward during normal operation while the inside portion remains engaged with an outside spherical body.

It is yet another object of the invention to provide a spherical vehicle having increased stability during turning and while parked in a stationary condition.

According to the invention, a spherical vehicle consists of two generally round semi-spherical halves forming an outer body equipped with doors for entering and exiting the vehicle. Alternately, a single spherical outer body may also be employed. An internal platform is positioned inside the spherical body and is resting on four columns positioned in its corners. Each column has a generally telescopic design and is equipped on each end with a braking shoe in such a way that each of the total of eight shoes can move up and down independently of others and is controlled by an emergency control system. The internal platform also contains passenger seats, the engine, steering system, and all other systems typically present in a modern day automobile.

The outer spherical body is equipped with an outer wheel diametrically positioned between the top and the bottom of the vehicle. The wheel is coupled with and driven by the internal engine in such a way that the coupling may be disengaged during emergency. In normal operation, the wheel propels the vehicle forward while the platform is engaged with the spherical body so the orientation of the vehicle remains constant. The spherical body contains all necessary attributes of the regular car: the set of windows for observing the road equipped with the windshield wipers, the set of doors for entering the vehicle, etc. Also attached to the outer body are two retractable steering wheels that can automatically extend from the inside compartment of the body in case of a turn of the vehicle to improve its stability. These retractable wheels are also used when the vehicle is stopped or parked to maintain the proper orientation and prevent accidental movements.

Alternate configurations include a smaller central spherical or regular single wheel positioned on the bottom of the spherical outer body.

During normal operation, the platform is firmly engaged with the outer spherical body, the engine causes the outer wheel to rotate and thus the vehicle is propelled forward. In case of a collision, upon withstanding the initial impact, the emergency system is instantly activated to disengage the braking shoes from the outer body, all internal components such as the engine are instantly disengaged from the outside components so the spherical vehicle is bounced off the subject of collision and starts to move away from the place of the accident due to its spherical shape. Since the braking shoes are disengaged, the platform with the passengers remains in the proper orientation and it is only the outer body which is rotating and therefore the passengers are being carried away from the accident. The emergency system is designed to use the braking shoes to controllably decelerate the motion of the vehicle until a complete stop is achieved in a preprogrammed optimum way. After that the engine and other components can be re-engaged with the corresponding outside components so the vehicle can be used further without incurring much damage to its components. As a result, the safety of the passengers is greatly improved.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE FIRST EMBODIMENT OF THE INVENTION

Figure 1:
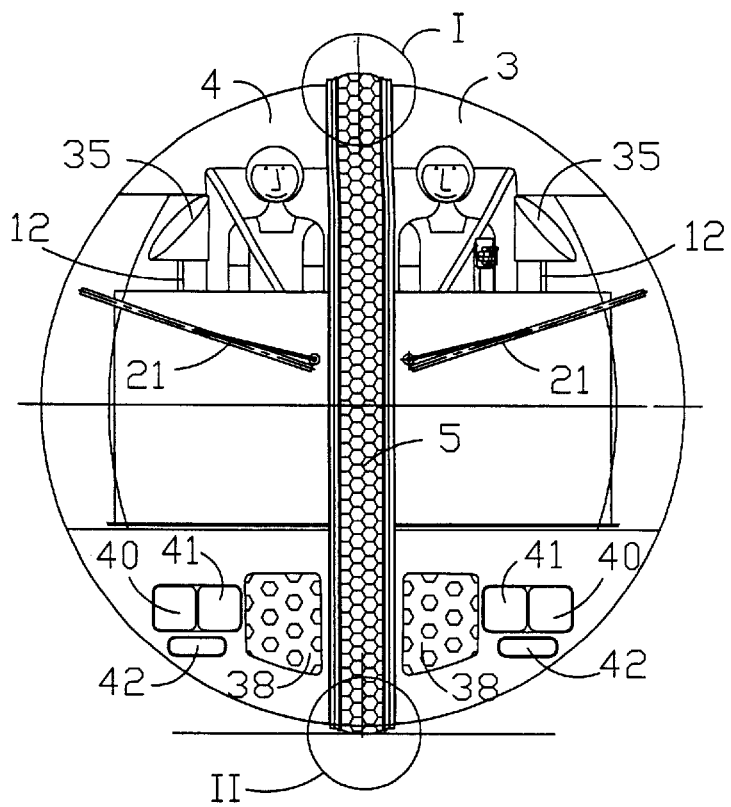
FIG. 1 is a highly schematic front view of the spherical vehicle according to the first embodiment of the present invention.
Figure 2:
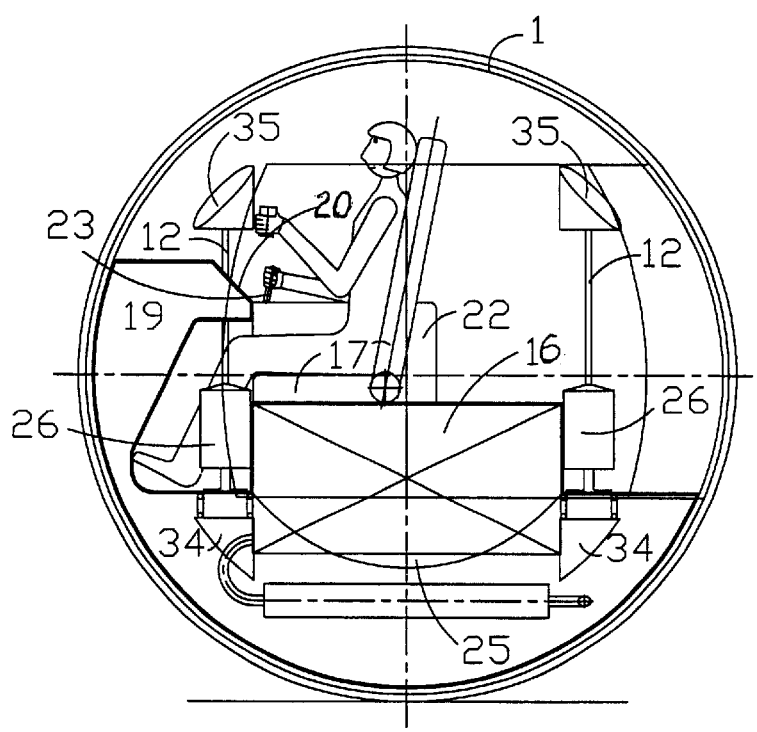
FIG. 2 is a highly schematic side view of the spherical vehicle according to the first embodiment of the present invention.
Figure 3:
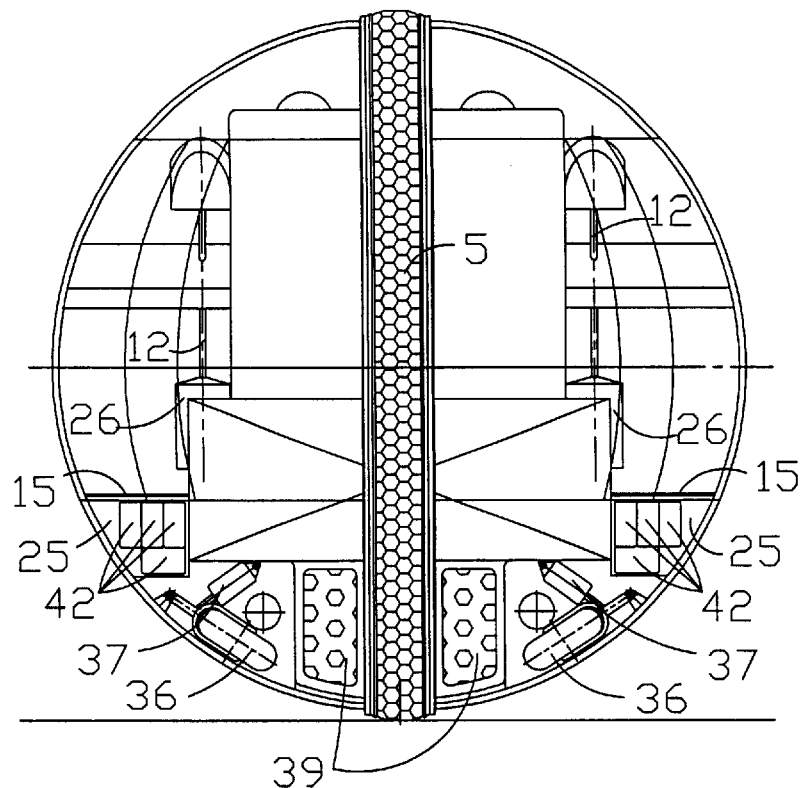
FIG. 3 is a highly schematic rear view of the spherical vehicle according to the first embodiment of the present invention.
Figure 4:
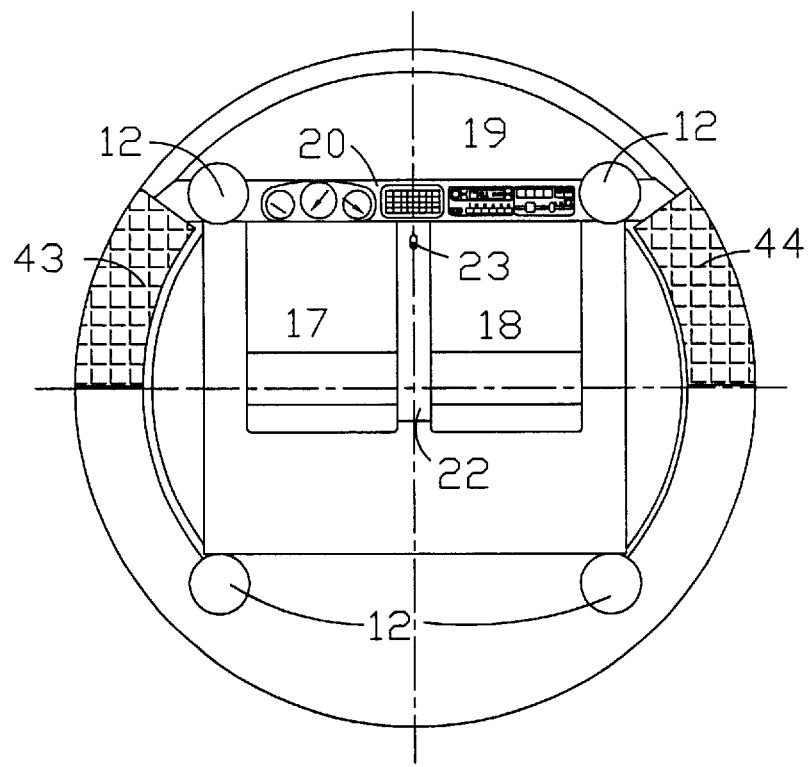
FIG. 4 is a highly schematic top view in cross-section of the spherical vehicle according to the first embodiment of the present invention.
Figure 5:
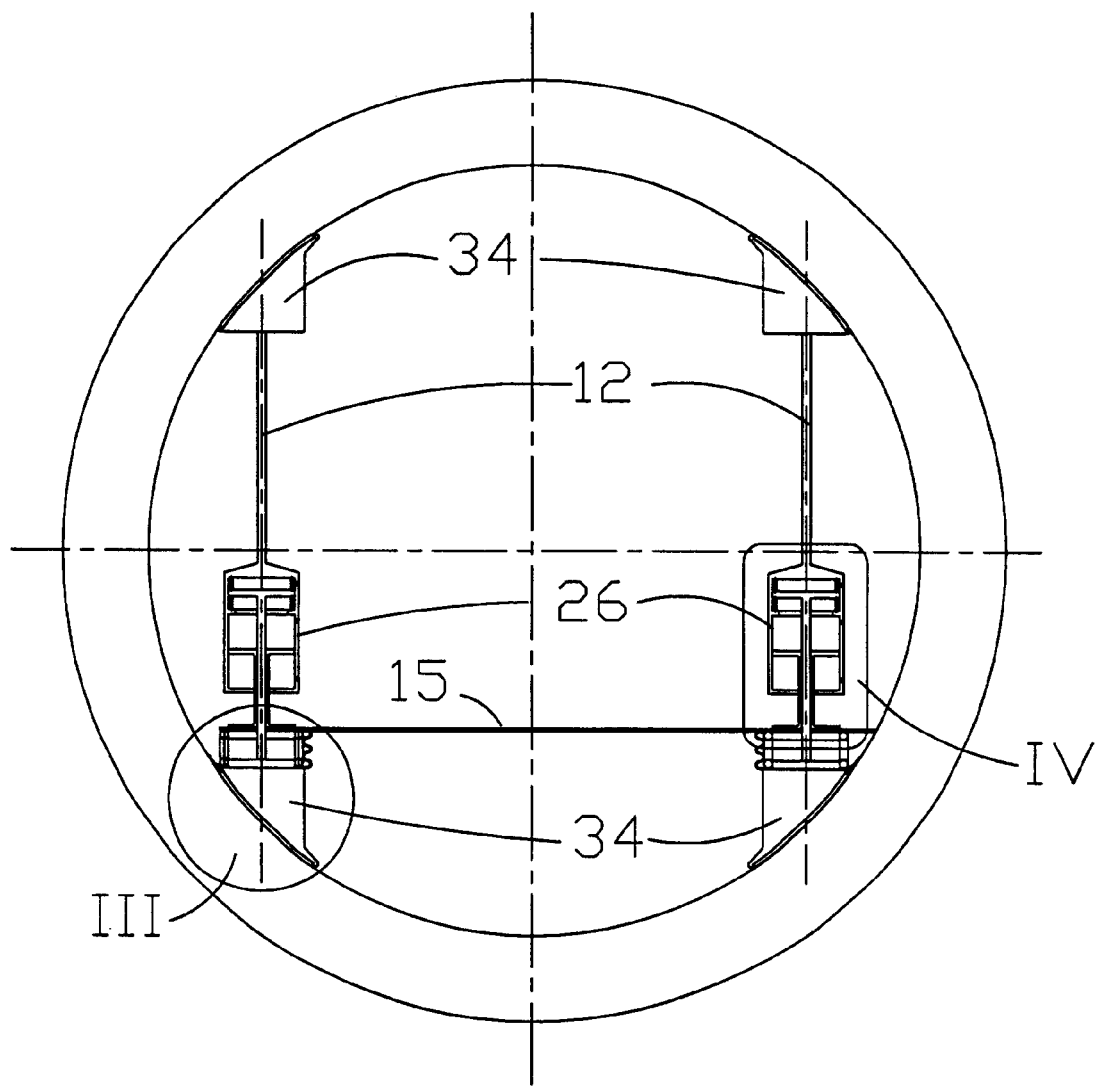
FIG. 5 is a highly schematic cross-sectional view of the spherical vehicle according to the first embodiment of the present invention showing the telescopic columns.
Figure 6:
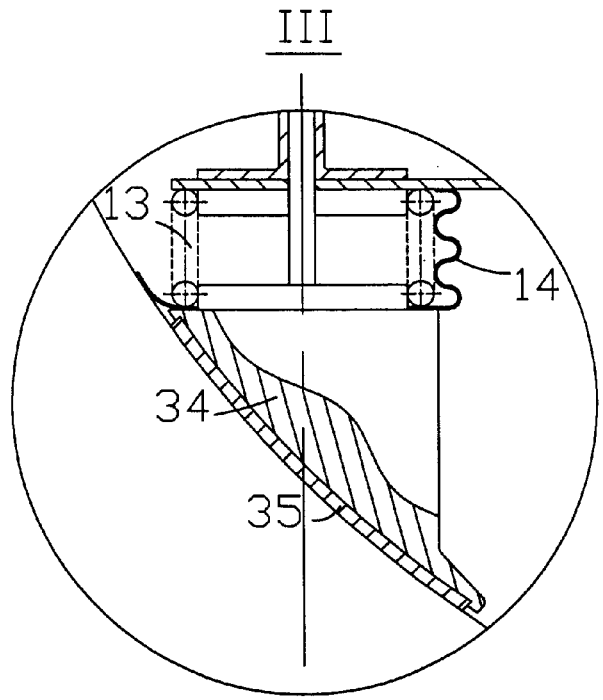
FIG. 6 is a highly schematic cross-sectional view of detail III from FIG. 5, the lower portion of one of the telescopic columns of the spherical vehicle according to the first embodiment of the present invention.
Figure 7:
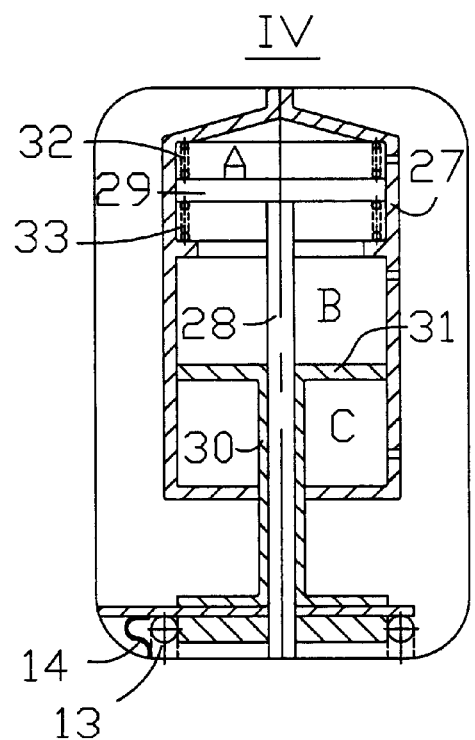
FIG. 7 is a highly schematic cross-sectional view of detail IV from FIG. 5, the middle portion of the telescopic column of the spherical vehicle with chambers "A", "B", and "C" according to the first embodiment of the present invention.
Figure 8:
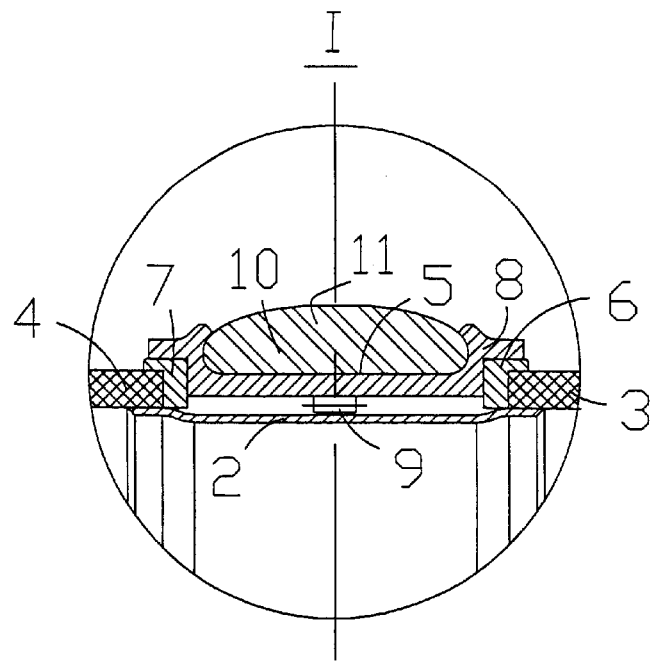
FIG. 8 is a highly schematic view of the detail I of the spherical body design from FIG. 1 in cross-section according to the first embodiment of the present invention.
Figure 9:
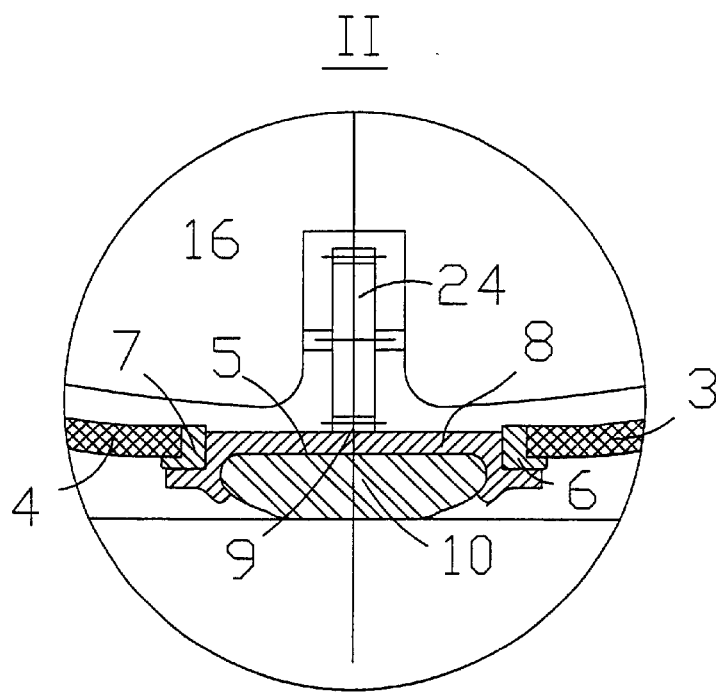
FIG. 9 is a highly schematic cross-sectional view of the detail II of the spherical body design from FIG. 1, and specifically of the coupling mechanism for connecting the engine to the outer wheel of the vehicle according to the first embodiment of the present invention.
Figure 10:
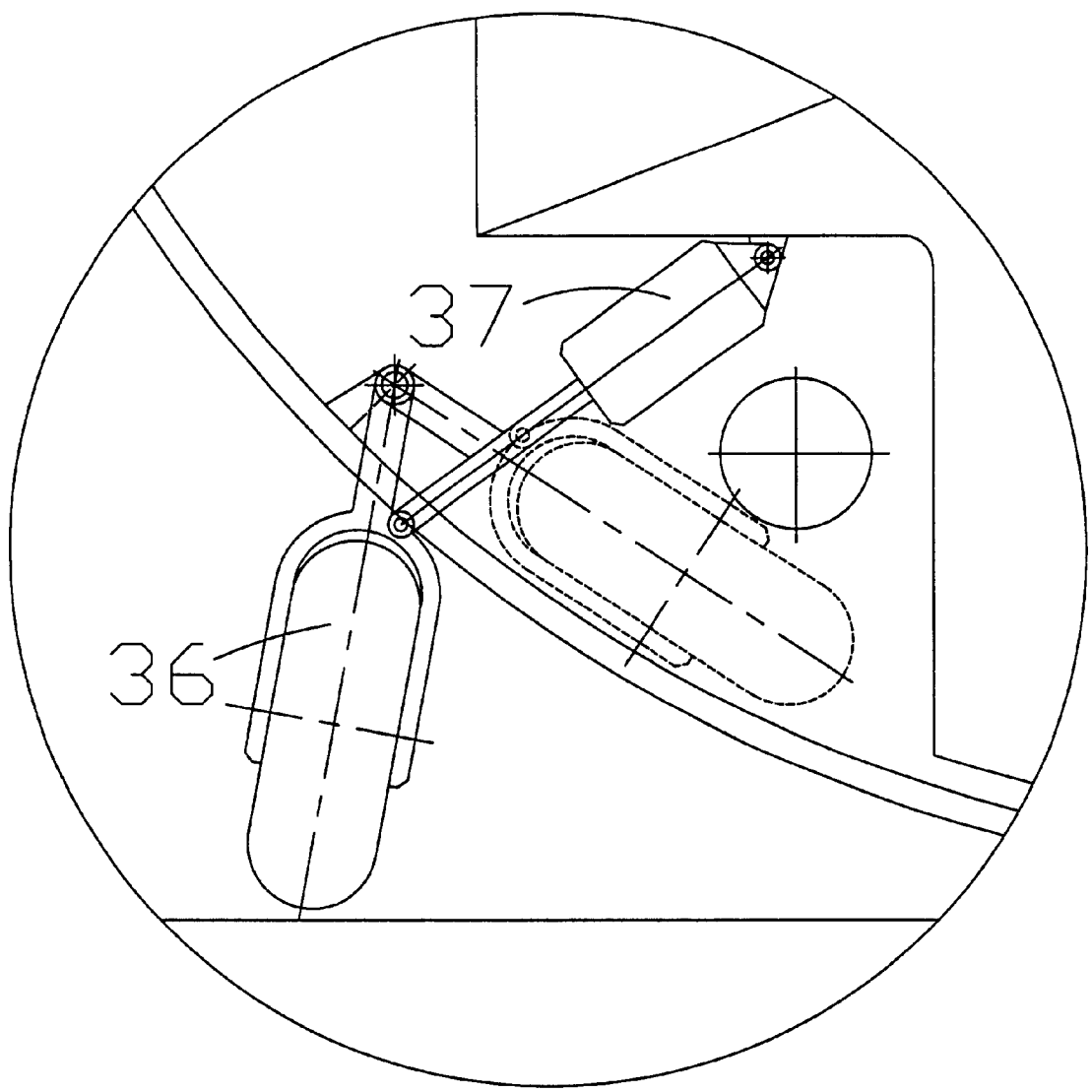
FIG. 10 is a highly schematic cross-sectional view of the retractable wheel of the spherical vehicle according to the first embodiment of the present invention.

A detailed description of the first embodiment of the present invention follows with reference to accompanying drawings on FIGS. 1 through 10 in which like elements are indicated by like reference numerals.

A spherical vehicle of the present invention consists of two semi-spherical halves (3) and (4) connected by plates (2) and forming an outer body (1). Semi-spherical halves (3) and (4) are preferably made from an impact resistant clear polymer.

The central outer wheel (5) is located between the halves (3) and (4) and can rotate in the bearings (6) and (7). The outer wheel (5) contains the rim (8) equipped with the gear transmission elements (9) and an inflatable rubber tire (10) with the thread (11).

Four telescopic columns (12) are located inside the outer body (1) in the periphery of the spherical outer body (1). Each of the columns (12) is equipped with a strut spring (13). Also provided is a bellows (14). The platform (15) rests on the four columns (12). One skilled in the art would readily appreciate that a different number of columns (12) can be employed for the support of the platform (15) ranging from two to eight or higher if needed. Four columns depicted on the drawings illustrate only one possibility attempting to simplify the design without sacrificing its functionality.

The platform (15) divides the outer body (1) into two compartments: the upper compartment for passengers and luggage, and the lower compartment for the engine and other technical systems of the vehicle. The platform (15) contains a central opening for the engine (16) equipped with appropriate transmission devices (not shown) to power up the vehicle. The driver seat (17) and the passenger seat (18) are mounted on top of the platform (15) with the ability to be moved forward and backwards allowing for position adjustment and for access to the engine compartment. Control unit (19) with the instrument panel (20) is placed in the front section of the platform (15) for the convenience of driver access. Control unit (19) contains among other elements the driver (not shown) for the windshield wipers (21).

Steering unit (22) is located between the driver and the passenger seats (17) and (18) respectfully and presents the driver with the steering and control lever (23) allowing the driver to completely control the vehicle.

The outer driving wheel (5) is driven by the engine (16) through the transmission elements (not shown) to the gear (24) and further onto the gear (9) of the rim (8). Fuel tanks (25) are located on both sides of the engine (16) in case of an internal combustion type of the drive system. Other motors and engines can also be used for the vehicle of the present invention such as an electrical motor in which case the batteries can be positioned in place of the fuel tanks (25).

To ensure the emergency braking as well as the added dampening of the road bumps, a two-chambered hydraulic cylinder (26) is placed in the middle portion of each telescopic column (12). It contains a housing (27), a plunger (28) with a piston (29) placed inside the "A" chamber, and a plunger (30) with a piston (31) inside a "B" chamber. Besides that, springs (32) and (33) effect the position of the piston (29) in the "A" chamber. Each column (12) is also equipped with the braking shoe (34) with a braking pad (35) positioned on the end of the plunger (28) of the hydraulic cylinder (26). On the opposite end of the column (12) the braking shoe (34) with the braking pad (35) are placed at the end of the column (12) which is directly connected to the housing (27) of the hydraulic cylinder (26).

Retractable wheels (36) are placed on the sides of the outer body (1) in the lower portion thereof and are equipped with the internal hydraulic or electrical drive (not shown) and the retraction mechanism (37). The wheels (36) are located towards the front of the vehicle to ensure its stability on turns and during parking.

Air intake registers (38) as well as exhaust registers (39) are located on both sides of the lower portion of the outer body (1). The outer body (1) also contains the headlights (40) and (41) and well as the signal lights (42). To enter and exit the vehicle, the doors (43) and (44) are made to slide out or, alternately, to flip open (not shown).

In use, the lever (23) is moved forward from the "PARK" position in the "START" position. That turns the engine (16) on, the hydraulic system is pressurized, and the yellow light indicates on the instrument panel the vehicle readiness. At the same time, the pressure in the "A" chamber of the hydraulic cylinder (26) forces the telescopic columns (12) to extend fully so that the braking pads (35) are engaged with the internal surface of the spherical body (1). In case of a light load of the vehicle, additional load of the spring (13) is achieved by raising the pressure in the "B" chamber of the cylinder (26). Once this step is complete, the green light is displayed indicating the ability of the vehicle to move forward.

Further advancing of the lever (23) to the "DRIVE" position makes the vehicle to start moving forward at the lowest possible speed. Further yet advancement of the lever (23) increases the speed of the vehicle to the safe level as controlled by the control system. Turning the lever (23) right or left causes the vehicle to extend automatically the wheels (36) only on the appropriate side and turn in the direction of that side along the safe radius of curvature. The control system reduces the speed of the vehicle at the same time assuring the safe turning conditions. Once lever (23) is returned to the neutral position, the action of turning is stopped so that the vehicle can continue to move on a straight line.

In case of a collision with another vehicle or with a stationary subject, the vehicle of the present invention may start rolling on the surface of the road out of control. However, the emergency system is instantly activated in the following way to prevent that from happening and to assure the safety of the passengers. Retractable wheels (36) if initially extended are quickly removed to the inside of the outer body (1). The pressure in the "C" chamber is raised and presses against the piston (31) and the plunger (30). As a result, the platform (15) with all components of the vehicle attached to it is raised up which leads in turn to the disengagement of the gear (24) with the rim (8), as well as the disconnect of the bellows (14) seal from the outer body (1). At the same time, the portion of the gear (9) of the rim (8) that was in communication with the gear (24) is closed off. The engine (16) is shut down while maintaining enough charge to power up this emergency procedure. The pressure in the "A" chamber is lowered automatically to the level of the minimum automatic braking pressure. This pressure is maintained by a hydraulic accumulator initially charged by the motor (not shown). The force of the braking pads (35) against the inside of the spherical outer body (1) is reduced to the point of slippage of the platform (15) against the outer body (1). The maximum braking is achieved by raising the center of gravity of the vehicle to the level of its center of rotation. This leads to the turning of the outer body (1) to one-quarter turn.

In case the braking force continues to increase, the center of gravity will continue to rise above the point of maximum braking efficiency. In that situation, the pressure in the "A" chamber is automatically reduced so the springs (33) return the braking shoes (35) in the original position. In the opposite case, namely the reduction of the braking force, the pressure in the "A" chamber is automatically increased which leads to the return of the center of gravity back to the previous position. Prior to the complete stop, the retractable wheels (36) are extended, and the gear (9) of the rim (8) is engaged again with the gear (24).

DETAILED DESCRIPTION OF THE SECOND EMBODIMENT OF THE INVENTION

Figure 11:
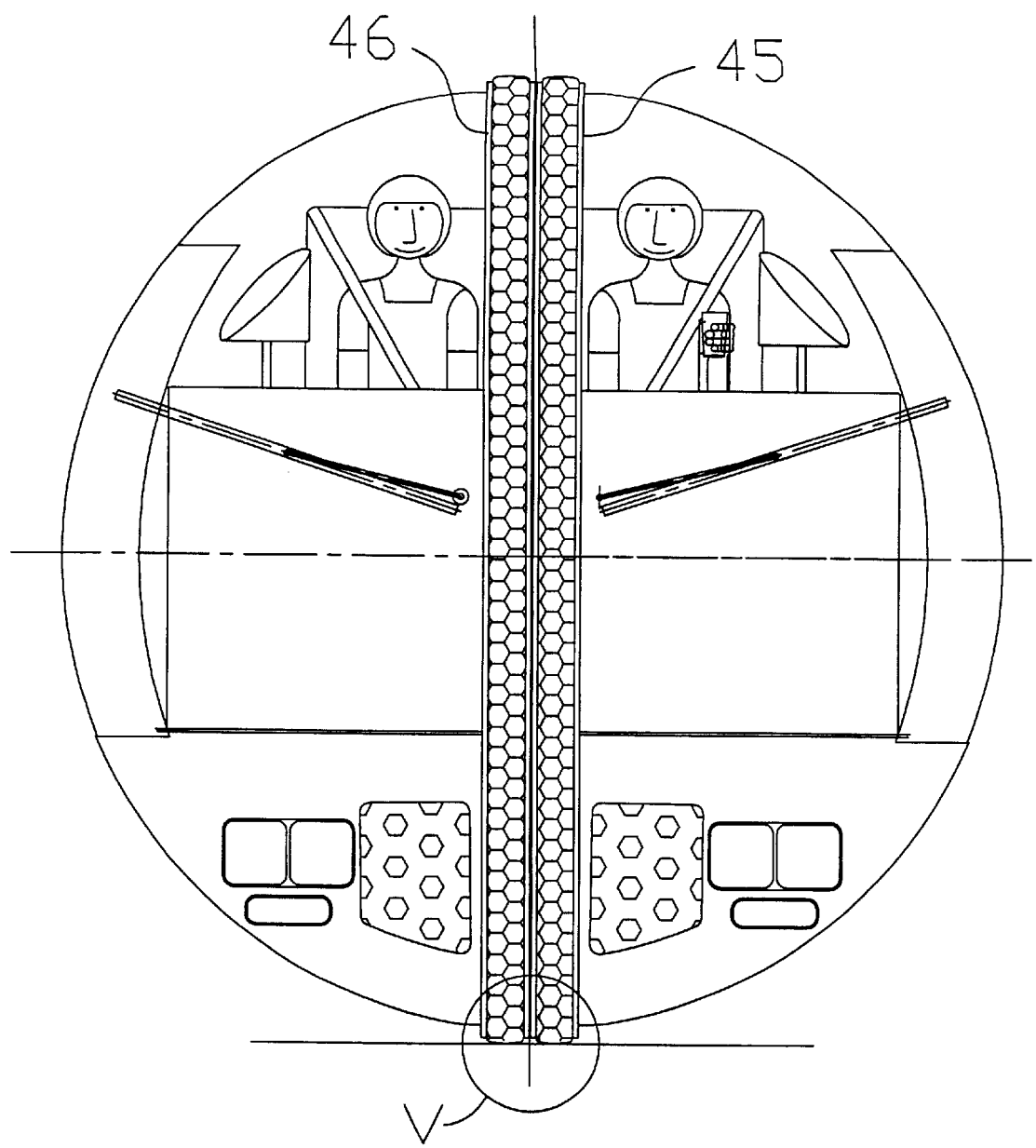
FIG. 11 is a highly schematic front view of the spherical vehicle according to the second embodiment of the present invention.
Figure 12:
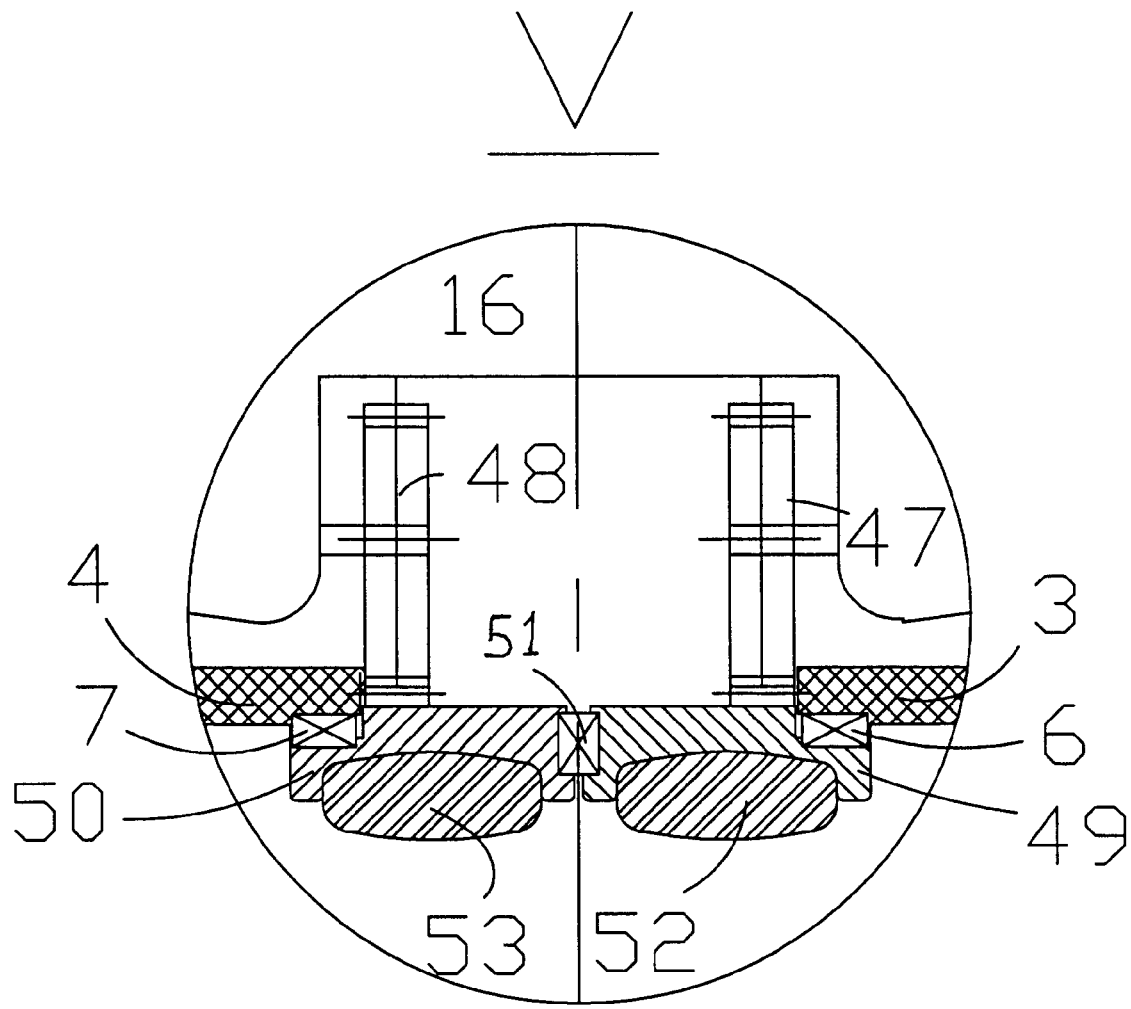
FIG. 12 is a highly schematic cross-sectional view of detail V from FIG. 11, the coupling mechanism between the engine and the outer wheels of the spherical vehicle according to the second embodiment of the present invention.

FIGS. 11 and 12 depict the second embodiment of the present invention. In this case, the outer driving wheel has two portions (45) and (46), driven both in a synchronous but separate way. The driving power from the engine (16) is transmitted to both the gears (47) and (48) in parallel but independently of each other and further to respective rims (49) and (50) of the wheels (45) and (46). In that case, rims (49) and (50) rely on a common support bearing (51) and contain the respective tires (52) and (53). The advantage of this arrangement is in that retractable wheels (36) can be made self-centering and in a totally passive way needing only a retraction mechanism (37) and not requiring any hydraulic or electrical drive.

The operation of the vehicle is similar to that described above for the first embodiment of the invention. The only difference is that during turning, one of the wheels (45) or (46) is rotated with a lower speed than the other so the vehicle is turning to the right or to the left appropriately. Of course, during this procedure, the retractable wheels (36) are extended but are not driven by a motor. They play a passive supportive role in the process of turning the vehicle.

DETAILED DESCRIPTION OF THE THIRD EMBODIMENT OF THE INVENTION

Figure 13:
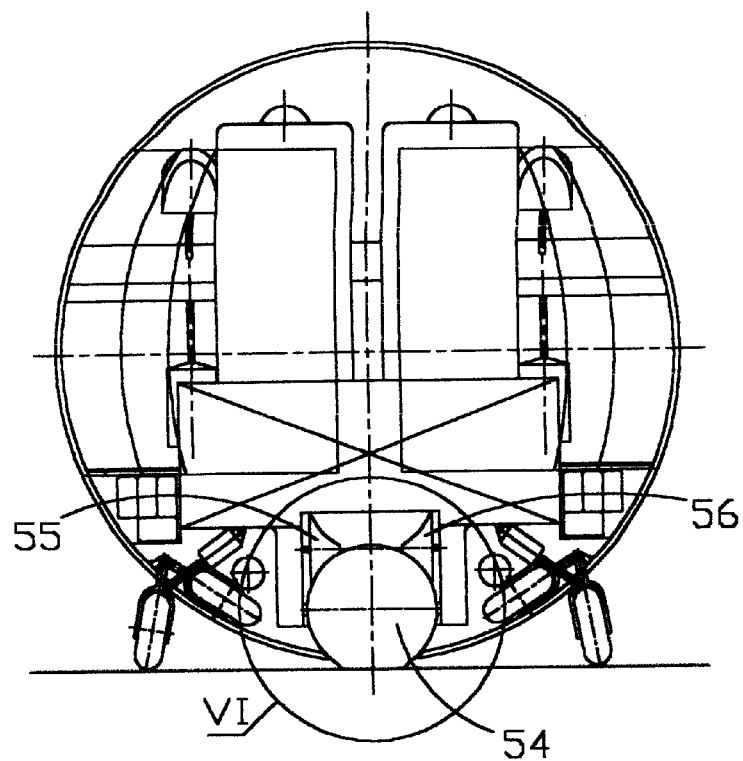
FIG. 13 is a highly schematic cross-sectional view of the vehicle according to the third embodiment of the present invention.
Figure 15:
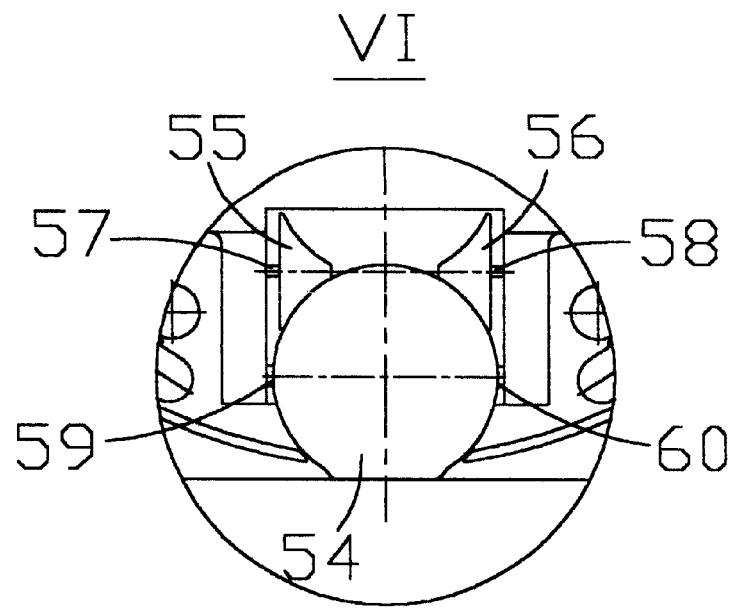
FIG. 15 is an enlarged view of the detail VI of FIG. 13.

FIGS. 13 and 15 depict the third embodiment of the present invention. Instead of a larger outer wheel about the periphery of the vehicle, a smaller spherical driving wheel (54) is positioned on the bottom of the vehicle. The outer body in that case may be optionally made as a single unit. The entire weight of the vehicle is supported by a single wheel (54) which in turn is positioned between self-centering support elements (59) and (60) on both sides of the vehicle. The wheel (54) extends below the boundaries of the spherical vehicle only a little to maintain all the safety features described above in the case of an emergency braking. It is preferred that this distance does not exceed 2 inches. In order to transmit the moving momentum from the vehicle engine to the spherical wheel (54), two engaging wheels (55) and (56) are rotatably attached to the shafts (57) and (58) respectively so that their speed can be individually adjusted by the operator of the vehicle. The wheels (55) and (56) have an inverted round shape to engage with the spherical wheel (54) for transmission of the momentum from the vehicle's engine.

In operation, to advance the vehicle forward, both wheels (55) and (56) are rotated with the same speed. To turn the vehicle in a predetermined direction, the respective wheel of that direction is slowed down relative to the opposite wheel depending on the safe curvature of the turn.

DETAILED DESCRIPTION OF THE FOURTH EMBODIMENT OF THE INVENTION

Figure 14:
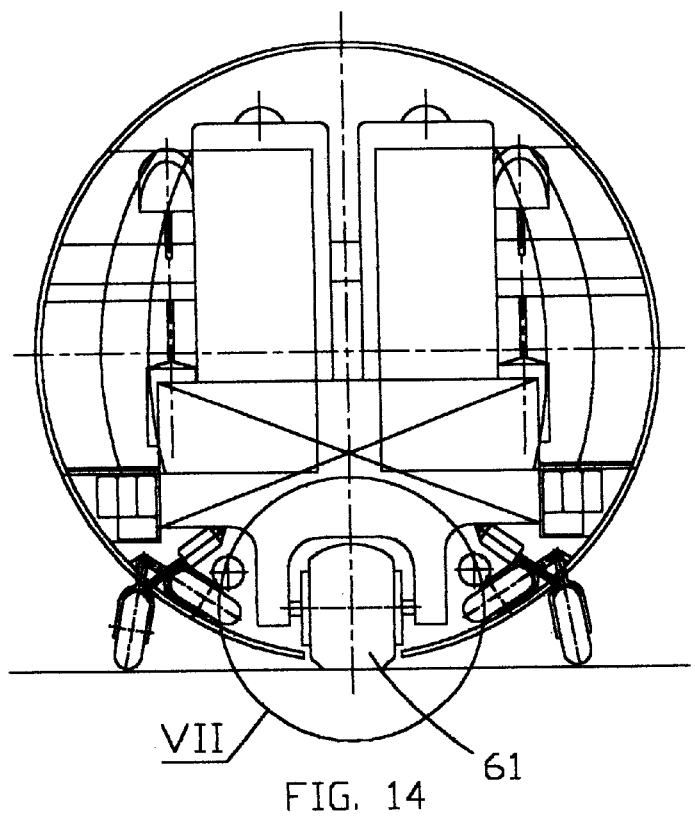
FIG. 14 is a highly schematic cross-sectional view of the vehicle according to the fourth embodiment of the present invention.
Figure 16:
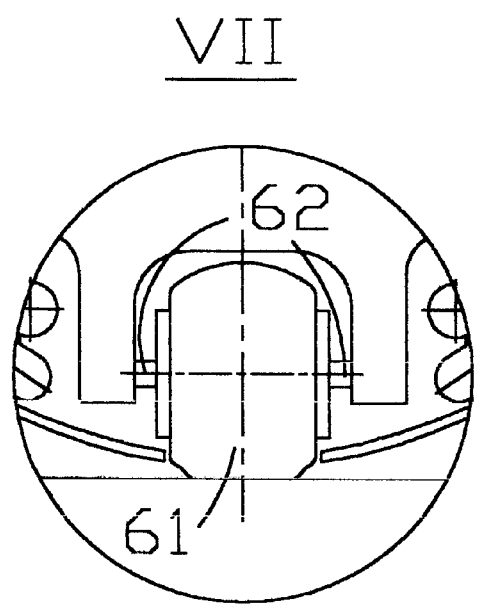
FIG. 16 is an enlarged view of the detail VII of FIG. 14.

FIGS. 14 and 16 depict the fourth embodiment of the present invention. Similarly to the third embodiment, a smaller central single wheel is positioned at the bottom of the vehicle. In this case, however, it is a regular cylindrical driving wheel (61) supported on both sides and driven by a shaft (62). The wheel (61) extends only as little as needed below the spherical outer body of the vehicle in order to assure its free movement. It is preferred that this distance does not exceed 2 inches. Turning means of a conventional design are also provided (not shown) to turn the vehicle via turning the wheel (61) to the left of to the right around its vertical axis.

In operation, the forward or backward movement of the vehicle is achieved by rotating the wheel (61) via the shaft (62) from the vehicle's engine. Turning of the vehicle is achieved by activating the above mentioned turning means.

Although the present invention has been described with respect to several specific embodiments and applications, it is not limited thereto. Numerous variations and modifications readily will be appreciated by those skilled in the art and are intended to be included within the scope of the present invention, which is recited in the following claims.

What I claim is:

1. A spherical vehicle comprising:
    a spherical outer body having a means for entering and exiting said vehicle, said outer body having an inside surface, said outer body having a lower portion,
    a driving wheel rotatably positioned about said outer body in a vertical orientation, said driving wheel having engaging means,
    a generally horizontal platform positioned inside said outer body,
    a plurality of telescopic columns, each column positioned at the periphery of said platform, each column equipped with a braking means, said braking means normally engaged with the inside surface of said outer body,
    a driving means positioned on said platform, said driving means adapted to retractably engage with the engaging means of said driving wheel to cause the movement of said vehicle,
    a set of retractable wheels positioned on both sides of said lower portion of said vehicle,
    a control system for driving said vehicle under normal conditions, and
    an emergency system for disengaging said platform and said driving means from said outer body and said driving wheel respectably in case of a collision, said emergency system applying a controlled braking force to said braking means as they slip against said inside surface of the outer body.

2. The spherical vehicle as in claim 1, wherein said outer body further comprises a first and a second semi-spherical halves, said halves made of an impact resistant clear polymer.

3. The spherical vehicle as in claim 1, wherein said driving wheel further comprising a rim and a tire, said wheel positioned around said outer body, said engaging means of said driving wheel being a gear positioned on said rim.

4. The spherical vehicle as in claim 1, wherein said emergency system further comprising an activation system for said braking means of said telescopic column, said activation system allowing for engagement under normal conditions or controlled slippage in case of a collision of said braking means against said inside surface of said outer body.

5. The spherical vehicle as in claim 4, wherein said activation system is a hydraulic system having a two-chambered hydraulic cylinder.

6. The spherical vehicle as in claim 4, wherein each of said braking means comprising a braking shoe with a braking pad on each side of said telescopic column.

7. The spherical vehicle as in claim 1, wherein said control system having a single lever for directing and driving said vehicle.

8. The spherical vehicle as in claim 1, wherein said driving wheel further comprising a first portion with a first engaging means and a second portion with a second engaging means, both portions driven independently by said driving means.

9. The spherical vehicle as in claim 1, wherein said driving wheel further comprising a single spherical wheel positioned and rotatably supported about a bottom of said outer body, said engaging means comprising a pair of symmetrical engaging wheels, each engaging wheel driven independently by said driving means.

10. The spherical vehicle as in claim 9, wherein said spherical wheel extending from said outer body by a distance less than or equal to two inches.

11. The spherical vehicle as in claim 1, wherein said driving wheel further comprising a single cylindrical wheel positioned and rotatably supported about a bottom of said outer body, said engaging means comprising a shaft powered by said driving means.

12. The spherical vehicle as in claim 11, wherein said cylindrical wheel extending from said outer body by a distance less than or equal to two inches.

* * * * *